L. W. PROEGER.
METHOD OF FORMING NECKS FOR HOLLOW GLASSWARE.
APPLICATION FILED JULY 12, 1911.
1,035,387.
Patented Aug. 13, 1912.
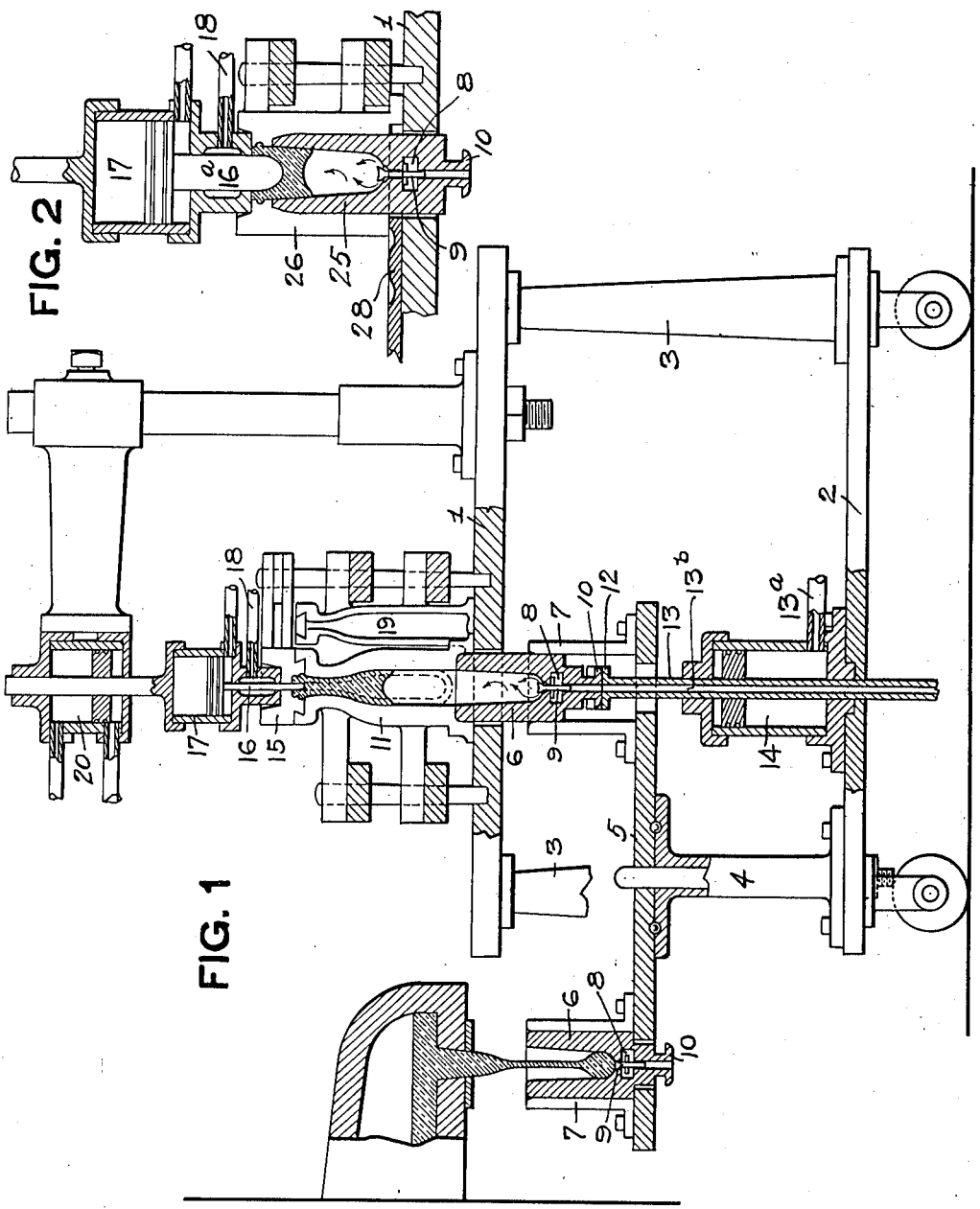
WITNESSES.
INVENTOR.

UNITED STATES PATENT OFFICE.

LUIS W. PROEGER, OF PITTSBURGH, PENNSYLVANIA.

METHOD OF FORMING NECKS FOR HOLLOW GLASSWARE.

1,035,387.      Specification of Letters Patent.     Patented Aug. 13, 1912.

Application filed July 12, 1911. Serial No. 638,223.

*To all whom it may concern:*

Be it known that I, LUIS W. PROEGER, a citizen of the United States, and a resident of Pittsburgh, in the county of Allegheny and State of Pennsylvania, have invented a new and useful Improvement in Methods of Forming Necks for Hollow Glassware; and I do hereby declare the following to be a full, clear, and exact description thereof.

My invention relates to the method of forming articles of glassware; and its main object is to provide for the molding or formation of the neck or upper portion of a blank for a bottle, fruit jar or other hollow article and the formation of the article from such blank without inverting the article and without the use of a plunger for molding the neck or mouth portion before the blowing operation to complete the article.

To these ends my invention consists, generally stated, in lifting a body of plastic glass by fluid pressure applied directly from below and thereby shaping the upper end of the blank within a mold, and afterward expanding the same to form the finished article.

In the accompanying drawing, I have illustrated apparatus for carrying out my improved method in which—

Figure 1 is a vertical elevation partly in section of suitable apparatus; and Fig. 2 shows my invention as applied to the making of a fruit-jar.

In the preferred practice of the method I utilize air pressure applied below the mass of plastic glass to raise or lift the mass into the neck forming portion of the mold, and the invention will be described in connection with this use of the method, though it is to be understood that any suitable fluid pressure may be utilized for lifting the glass within the method for the formation of the neck or mouth portion of the blank and that the same is included within my invention.

Before particularly describing the practice of the method I will describe the apparatus as illustrated in the drawing suitable for carrying out the same.

Referring to the drawing, 1 designates a suitable mold-table which is supported on the bed-plate 2 by the standards 3. The bed-plate may be provided with suitable wheels for moving it from place to place. On the bed-plate is the stand 4 which supports the table 5. Carried by the table 5 are the cups 6 which may be termed, in this particular instance, the mold-extension cups, in that they coöperate in connection with the blank-mold in the carrying out of my method. These cups 6 are slidable in the fixed guides 7. The cups 6 are provided with air-inlets 8 at their lower ends normally closed by the stems 9. The cups are also provided with the heads 10. The table 5 is illustrated as adapted to revolve and may be moved by hand, or suitable mechanism may be provided for this purpose.

A head 12 is carried by the hollow piston-rod 13 which works back and forth in the cylinder 14, air being admitted to the cylinder by the pipe 13ª to raise the piston. When one of the cups is brought around in position with the head 10 in alinement with the head 12 of the piston-rod, the piston-rod is raised and the cup is likewise raised to coöperate with the blank-mold 11 and forms an extension of said blank-mold. This blank-mold 11 is mounted on the table 1 and said blank-mold is an ordinary two-part mold adapted to open and close in the ordinary manner. At the upper end of the blank-mold is the neck-mold 15 which has a matrix or cavity of the form required for making the article desired, which in the present instance is a narrow-neck bottle. An internal molding member or plunger 16 is operated by a piston within the cylinder 17 and the air-pipe 18 is provided for admitting air to the blank. A cylinder 20 is provided for raising the cylinder 17 and the plunger 16 above the neck-mold 15 when the article has been finished and it is desired to open the blow-mold and neck-mold and remove it therefrom. A blow-mold 19 is employed to close around the blank which is formed in the mold 11 and in which the final blowing operation takes place to expand the blank.

By the utilization of fluid pressure as above described for lifting the body of glass into the mold and forcing it into the neck mold the glass is lifted bodily and sufficient pressure can be brought to bear upon the lower face of the body of glass to properly mold the neck portion of the glass article without chilling the body of glass. As the preliminary molding is thus effected by fluid pressure while the parts are in the upright normal position it is evident that the operation can be rapidly carried on, as after this preliminary molding the glass is permitted to elongate by its own weight and can be handled in the same way as in the ordinary blowing operation, and the time and complicated machinery required for carrying the mold from inverted position to normal position and for permitting the glass to elongate when brought to that position, is entirely saved while much complication of machinery is done away with.

In carrying out my improved method the plastic glass is fed to the cup 6 in any desired way, for example, with the above apparatus the plastic glass is allowed to pass from the furnace outlet into the cup 6 in position to receive it, and when the proper amount has been introduced into the cup to form the article desired the furnace outlet is closed in any suitable manner and the cup with the plastic glass is moved around into position where the head 10 will be in alinement with the head 12 of the piston 13. By admitting air to the cylinder 14 the piston is raised, and with it the cup 6 which is brought up into engagement with the blank-mold 11 forming an extension of said mold. Air or other fluid pressure is admitted through the hollow piston-rod 13, such as through the central passage 13$^b$, and this air passes up through the air-inlet 8 into the cup 6. This air pressure will lift the mass of plastic glass bodily within the blank-mold, and the glass will be forced up into the neck-mold so as to fill the matrix, said air-pressure having sufficient force to thoroughly fill the neck-mold matrix around the plunger 16 forming the initial opening in the blank and give the proper form to the blank. The plunger 16 is then withdrawn and sufficient air may be admitted to the glass-blank through the pipe 18 to form a preliminary cavity in the blank, and partially form the same within the blank-mold 11, as shown in dotted lines. The extension-cup 6 is then withdrawn, the blank-mold opened and the blow-mold 19 closed around the blank, when additional air is admitted by the pipe 18 to blow out the blank in the blow-mold to form the finished bottle. After this is done the cylinder 20 lifts the cylinder 17 and the plunger 16 to clear the neck-mold and the neck-mold and the blow-mold can then be opened to remove the article.

By my improved method I provide for the lifting or raising of a mass of plastic glass up within a mold and forcing the glass into a matrix to form the neck or one end of the article, by means of air or other fluid pressure admitted to the mold and so am enabled to employ a blank mold which is in its upright normal position as distinguished from an inverted blank-mold so that when the blank is formed and the blank-mold opened it is not necessary to invert the blank, but the blow-mold is thrown around the blank and the blowing operation is completed without changing the position of the blank. Furthermore, by my improved method I can employ a cup-extension for the blank-mold into which the glass is delivered and which has a large opening for this purpose, and when this cup extension is brought around in proper position with reference to the blank-mold the plastic glass is lifted up in the blank-mold and the blank formed without either inverting the blank-mold or attempting to introduce the molten glass into the narrow inlet of the neck-mold, which is a very difficult and impractical way of introducing the glass where narrow-neck bottles are to be formed.

In Fig. 2 I have illustrated my method as applied to the making of a fruit-jar in which the cup 25 contains the plastic glass and said cup is introduced within the blow-mold 26 from below, air is admitted as above to the bottom of the cup and the glass is raised or lifted so as to fill the neck matrix around the internal molding member 16$^a$, and when the blank has been formed in this manner the cup is withdrawn, a suitable bottom 28 is applied to the blow-mold and the jar is finished in the manner above described.

What I claim is:

1. The method of forming glass blanks in molds, consisting in lifting the plastic glass by fluid pressure applied directly to the glass from below and thereby shaping the upper portion of the blank.

2. The method of forming hollow glass articles in molds, consisting in lifting the plastic glass by fluid pressure applied directly to the glass from below and thereby shaping the upper end of the blank, and then expanding the blank.

3. The method of forming hollow glass articles, consisting in forming a gather of plastic glass within a cup, carrying the same under a mold, forcing the glass by fluid pressure applied directly to the glass from below into the neck forming portion of the mold and subsequently expanding the blank.

4. The method of forming hollow glass articles, consisting in lifting a body of plastic glass by fluid pressure applied directly to the glass from below into the neck-forming portion of a mold and around a projecting mouth forming mold member to form the finished hollow mouth portion of the article, and then expanding the blank so formed.

5. The method of forming glass articles, consisting in lifting a plastic glass body by fluid pressure applied directly to the glass from below upwardly within a blank-forming mold and thereby molding the mouth portion of the blank to finished form, expanding the blank so formed by fluid pressure within a blank-mold and then with-drawing the blank-mold and substituting the finishing-mold and expanding the blank to finished form.

6. The method of forming hollow glass articles, consisting in forming a gather of plastic glass within a cup, registering that cup with a blank-forming mold, applying fluid pressure applied directly to the glass from below to raise the glass within the blank and mold and so forming the mouth of the article, and then expanding the blank.

7. The method of forming hollow glass articles, consisting in forming a gather of plastic glass within a cup, registering the cup with a blank-forming mold and lifting the plastic glass by fluid pressure applied directly to the glass from below within the blank-forming mold to form the mouth of the article, expanding the glass within the blank-forming mold, substituting a finishing-mold and expanding the glass therein to finish the article.

In testimony whereof, I the said LUIS W. PROEGER have hereunto set my hand.

LUIS W. PROEGER.

Witnesses:
  WM. A. STEINMEYER,
  JOHN F. WILL.